3,306,748
PHOTOSENSITIVE SYSTEM BASED ON HYDROPHOBIC DYE CYANIDES AND POLYVINYLPYRROLIDONE
Lyman Chalkley, Prince Georges County, Md.
(5320 Middleton Lane, Washington, D.C. 20022)
No Drawing. Filed Mar. 5, 1963, Ser. No. 263,070
14 Claims. (Cl. 96—90)

This invention relates to a photochemical process and product, and more particularly to a photosensitive system based on a combination of a hydrophobic amino dye cyanide and polyvinylpyrrolidone.

Hydrocolloid films sensitized with hydrophilic dye cyanides have advantages for photographic applications over previously used hydrophobic plastic films sensitized with hydrophobic dye cyanides. The hydrocolloid films are more easily coated onto paper and transparent bases without "striking through" paper or distorting the transparent base as plastic coating solutions are prone to do. Moreover, it is common for plastic films to undergo slow changes in properties due to continuing polymerization or evaporation of plasticizers, and these changes can alter the printing speed and even the color of image printed upon sensitized plastic films.

However, the hydrophobic dye cyanides used in plastic films have some advantages over the hydrophilic dye cyanides used in hydrocolloid films. The hydrophobic dye cyanides are generally cheaper, more easy to prepare and capable of higher quantum yields (and therefore faster printing speeds) than the hydrophilic dye cyanides.

Thus advantages would be gained if a hydrophobic dye cyanide could be used to sensitize a hydrocolloid film or sheet. Unfortunately hydrocolloids generally cannot be photosensitized by the hydrophobic dye cyanides. The known exception to this statement is the ability of the hydrophobic primary amino dye cyanides to sensitize the collagenous proteins, especially gelatine.

The gelatine-hydrophobic primary amino dye cyanide sensitized films have the advantages indicated above, but have been limited to a narrow range of image colors—magenta—and have some other disadvantages which will be pointed out below.

I have now found that polyvinylpyrrolidone film is a powerful photoactivator for hydrophobic dye cyanides containing primary and secondary amino groups, and that the polyvinylpyrrolidone system sensitized with hydrophobic dye cyanides has a number of useful and unexpected advantages over the collagenous protein-hydrophobic dye cyanide system. Some of these advantages are:

(1) Higher concentrations of the primary and secondary amino dye cyanides can be put into polyvinylpyrrolidone film than into gelatine film. This advantage is probably the result of two effects: (a) polyvinylpyrrolidone appears to be a more powerful solvent for the primary and secondary amino dye cyanides than gelatine; and (b) the combination of polyvinylpyrrolidone with the hydrophobic dye cyanide is more stable to water than the combination of gelatine with the same dye cyanide.

The more concentrated films provided by the use of polyvinylpyrrolidone makes possible a substantial reduction in film thickness needed to print a fixed density. This improvement is of great advantage in films used for printing masks and for color proofing applications.

Another gain is in high resolution films. Grainless gelatine films sensitized with hydrophobic primary amino dye cyanides can be made but they must be relatively thick, usually a few mils, to print a desirable density. But thickness in a photosensitive film detracts from its resolution. Clear sensitized polyvinylpyrrolidone films can be made a fraction of the thickness of sensitized gelatine films.

A further advantage of the higher concentration polyvinylpyrrolidone films is the increase in printing speed resulting from the reduction in the proportion of incident light absorbed by the hydrocolloid. Both gelatine and polyvinylpyrrolidone absorb ultra-violet. When the ratio between dye cyanide and hydrocolloid is low, as in gelatine films, the energy loss due to absorption by the gelatine can be considerable. In the more concentrated polyvinylpyrrolidone films the energy loss through hydrocolloid absorption is less.

(2) The photoactivating and solvent effects of polyvinylpyrrolidone extend to the secondary amino dye cyanides, thus expanding the magenta colors that have been printed on gelatine hydrophobic dye cyanide sensitized films to include a range of purples continuing into deep violet.

(3) In gelatine the hydrophobic primary amino dye cyanides are normally phototropic and the printed images fade more or less completely in the dark. This fading is undesirable for most photographic applications. It can be prevented by acidification of the system. But the added acid has a tendency to decompose the gelatine and in the gelatine-dye cyanide systems to form slowly a yellow stain that reduces the printing speed.

In contrast, the polyvinylpyrrolidone-hydrophobic dye cyanide system is not phototropic. The addition of acid is not necessary to prevent fading of the image in the dark and any chance of slow decomposition due to added acid may be eliminated. Of course, polyvinylpyrrolidone may be employed also in acid systems where the addition of acid is desirable for other reasons than the prevention of phototropic fading.

The use of polyvinylpyrrolidone has other advantages over the use of gelatine as the film forming material. The solubility of polyvinylpyrrolidone in organic solvents that also dissolve the hydrophobic dye cyanides and its ability to form clear films from organic solvents increase the number of methods and ease by which sensitized films may be prepared. At the same time polyvinylpyrrolidone has enough of the buffering effect of gelatine to permit the introduction of the dye cyanide as its hydrochloride or other salt by the methods used for the preparation of sensitized gelatine films. Additional advantages will be apparent from the following description and examples.

The dye cyanides that can be combined with polyvinylpyrrolidone to form useful photosensitive films contain an amino group that has at least one hydrogen atom on it. Hydrophobic dye cyanides that contain only tertiary amino groups do not appear to be photoactivated by polyvinylpyrrolidone.

The suitable dye cyanide has the general formula

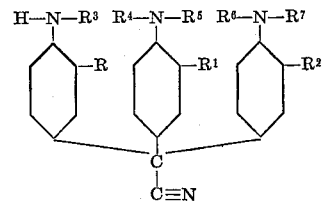

wherein R, R¹ and R² are each selected from the group consisting of a hydrogen atom and a methyl group, and R³, R⁴, R⁵, R⁶ and R⁷ are each selected from the group consisting of a hydrogen atom and an alkyl group. Suitable alkyl groups are methyl, ethyl, propyl and butyl. Examples of suitable dye cyanides with an amino group holding one or two hydrogen atoms are: 4,4′,4″-triamino - triphenylaceto-nitrile; 4,4′,4″-triamino-3-methyl-triphenylacetonitrile; 4,4′,4″ - triamino-3,3′,3″-trimethyl-triphenylacetronitrile; 4,4′,4″ - tris-methylamino-triphenylacetonitrile; 4,4′,4″ - tris - ethylamino-3,3′,3″-trimethyl-triphenylacetonitrile.

Polyvinylpyrrolidone film has the ability to hold these hydrophobic dye cyanides in clear solution in spite of the hygroscopic nature of polyvinylpyrrolidone and the considerable water content of its films when in contact with air. Under the same conditions the completely alkylated amino dye cyanides crystallize and make a cloudy and insensitive film.

Polyvinylpyrrolidone is commercially available in various degrees of polymerization and molecular weight. While materials having molecular weights from less than 30,000 to more than 400,000 are satisfactory, I prefer materials with molecular weights of 40,000 to 400,000 or more for photographic films.

Films may be prepared from solutions in water or in organic solvents or in mixtures of solvents.

In addition to the dye cyanide and polyvinylpyrrolidone substances may be added to the film forming solution to modify its properties or the properties of the resulting film in accordance with the known technology of polyvinylpyrrolidone. Thus carboxymethylcellulose, tannic acid and polyacrylic acid may be added to reduce tackiness of the film, etc.

To prepare the photosensitive film the dye cyanide and polyvinylpyrrolidone are dissolved or suspended in solvent and applied to the chosen substrate—glass, paper, plastic film, metal, fabric or other—by any of the familiar methods, including casting, impregnation, roller coating, whirler coating, rubbing on and the like. The solvent is evaporated or extracted to leave the photosensitive film. Because of its mechanical properties unsupported polyvinylpyrrolidone films are generally less desirable for photographic use than films coated onto more rigid or tough supports. However, unsupported sensitized film may be readily prepared by casting and stripping and other familiar methods.

The ratios of dye cyanide, polyvinylpyrrolidone and solvent are not critical and may vary widely depending on the method of coating to be employed and the thickness of final film to be produced. The final film should preferably contain from 0.01 to 5.0 milligrams of dye cyanide per square inch of surface.

The invention is disclosed further in the following examples, which are set forth as being illustrative but not limiting. The operations are carried out in absence of ultraviolet, preferably by yellow light.

*Example 1*

To 720 ml. of ethylene glycol monomethyl ether is added 0.8 g. of 4,4′4″-triamino-triphenylacetonitrile, which is dissolved by stirring at room temperature. To this solution is added 80 g. of polyvinylpyrrolidone with an average molecular weight of 40,000 ("PVP-K-30" sold by Antara Chemicals, New York), which is dissolved to a clear colorless solution by stirring at room temperature. One square meter of level glass plate is coated with this solution and the solvent evaporated in a stream of air to leave a hard, clear, colorless, grainless photosensitive film upon the glass. The sensitized glass plate on exposure to wave lengths shorter than about 3300 A. prints out a permanent magenta image. The product is useful for making dodging masks, registration plates for photolithographers, color proofing prints, etc., all by direct printing without chemical processing.

*Example 2*

Proceed as in Example 1 but coat onto polyester film to yield a photosensitive coated plastic film.

*Example 3*

To a solution of 1.6 g. of 4,4′,4″-triamino-3-methyl-triphenylacetonitrile in 700 ml. of ethylene glycol monoethyl ether is added 80 g. of polyvinylpyrrolidone, "PVP K-30," which is dissolved by stirring at room temperature. Two square meters of paper, glass, cellulose acetate or polyester film is coated with this solution and the solvent evaporated in a stream of warm air (about 50° C.) to leave a dry photosensitive coating that prints a permanent magenta image on exposure to wave lengths shorter than about 3300 A. The paper is especially useful for printing templates, copying drawings and making recordings by ultraviolet radiation as in oscillographs, all without chemical processing.

*Example 4*

A solution of 1 g. of 4,4′,4″-triamino-3,3′,3″-trimethyl-triphenylacetonitrile and 80 g. of dry polyvinylpyrrolidone, "PVP K-30" in 750 ml. of dry acetonitrile is coated onto 1 square meter of glass or plastic sheet and the solvent evaporated in a stream of dry air to leave a hard, transparent, colorless photosensitive film. The use of acetonitrile as the solvent permits much faster drying than when the ethylene glycol derivatives are employed. However, the rapid evaporation of acetonitrile in moist air may cause condensation of enough moisture to precipitate some of the dye cyanide from solution. The precipitate is in colloidal suspension and redissolves in the polyvinylpyrrolidone on complete drying to leave a clear photosensitive film. However, films formed from a mixture of acetonitrile and water may not have smooth surfaces. Therefore, the avoidance of unnecessary moisture is generally desirable in this preparation.

*Example 5*

A solution of 0.4 g. of trimethyl-p-rosaniline cyanide and 80 g. of "PVP K-30" in 700 ml. of dimethylformamide is coated onto 1 square meter of glass or polyester plastic film and the solvent evaporated in a stream of air heated to 45° C. to leave a hard, colorless, clear photosensitive coating that on exposure to wave lengths shorter than about 3300 A. prints out a permanent reddish violet grainless image.

*Preparation of trimethyl-p-rosaniline cyanide.*—A mixture of 1.33 g. of 4,4′,4″-triamino-triphenylacetonitrile and 23 ml. of ethylene glycol monomethyl ether is heated briefly to boiling to dissolve the crystals and cooled to room temperature. A solution of 2.4 g. of methyl-p-toluene sulfonate in 7 ml. of ethylene glycol monomethyl ether is added and the mixture allowed to stand in the dark at 25° C. for 7 days. The solution remains clear. It is poured into 200 ml. of water, filtered from any slight precipitate (which is discarded) and the filtrate made alkaline with ammonium hydroxide to neutralize the p-toluene sulfonic acid and precipitate the dye cyanide. After standing over night the precipitate is collected on a filter, rinsed with water and dried in a vacuum desiccator over sulfuric acid. The colorless product is a mixture containing primarily 4,4′,4″-tris-methylamino-triphenylacetonitrile and smaller quantities of position isomers and mono-, di-, tetra-, and penta-methyl derivatives, all characterized by containing secondary amino groups.

*Example 6*

Example 5 is repeated but with the use of triethyl new fuchsine cyanide in place of the trimethyl-p-rosaniline cyanide. Triethyl new fuchsine cyanide is prepared by ethylation of 2 g. of 4,4′,4″-triamino-3,3′,3″-trimethyl-triphenylacetonitrile with 2.6 g. of ethyl iodide. The image color is violet.

Example 7

The K-30 grade of polyvinylpyrrolidone used in the above examples may be replaced by other grades. In some cases, as when plates or films are to be coated on a whirler, a higher viscosity is desirable in the coating solution and a polyvinylpyrrolidone with a higher molecular weight is preferable. For this use the commercial grade "PVP K-90" with a molecular weight of about 360,000 is satisfactory.

For example, to prepare a fairly thick sensitized film by whirler coating, 1 g. of 3,3',3"-triamino-triphenylacetonitrile is dissolved in 300 ml. of "Cellosolve" (ethylene glycol monoethyl ether) and 52 g. of "PVP K-90" added as a dry powder and stirred until a homogeneous solution is obtained. This solution when coated onto polyester film on a horizontal whirler rotating at 60 r.p.m. and dried under a fan leaves a dry clear colorless photosensitive film about 1.5 mils thick.

Example 8

Coating solutions containing organic solvents will often strike through paper stocks of the type used as bases for diazo, blueprint and some other photosensitive papers. To coat such base papers without strike through, an aqueous coating solution is desirable. Polyvinylpyrrolidone sensitized with hydrophobic primary and secondary amino dye cyanides is readily coated from aqueous solution.

For example, a solution of 3.5 g. of 4,4',4"-triamino-triphenylacetonitrile trihydrochloride in 320 ml. of water is mixed with a solution of 160 g. of "PVP K-90" in 3,000 ml. of water to form a clear coating solution that may be used directly or diluted with an equal volume of water depending upon the coating method, absorbance of the paper base and degree of sensitization desired. Paper may be coated by any of the usual methods.

The polyvinylpyrrolidone has sufficient reserve alkalinity to reduce the acidity of the dye cyanide hydrochloride so that the film exhibits the high printing speed and pure magenta image hue of the dye cyanide base sensitization instead of the low printing speed and degraded image hue shown by the dye cyanide salts.

Example 9

Under normally dry atmospheric conditions the sensitized polyvinylpyrrolidone films described above are hard and flexible with desirable physical properties. However, at high humidities the unmodified films show the tendency characteristic of polyvinylpyrrolidone to become tacky. The known methods employed in polyvinylpyrrolidone technology to reduce this tackiness may be applied to the sensitized films. Thus tannin, polyacrylic aid, carboxymethyl cellulose or other materials used to prevent tackinjess may be added to the photosensitive coatings.

For example, a photosensitive coating that will not become tacky may be prepared as follows. To a solution of 50 g. of "PVP K-90" and 50 g. of low viscosity carboxymethyl cellulose sodium salt (Type 70 Low Cellulose Gum manufactured by the Hercules Powder Co., Wilmington, Delaware) in 3000 ml. of water is added a solution of 2 g. of 4,4',4"-triamino-triphenylacetonitrile trihydrochloride in 500 ml. of water and the two stirred to form a homogeneous coating solution that is allowed to stand until the foam breaks or is placed in a closed vessel which is then evacuated to break the foam that generally forms during mixing. Paper is coated with this solution and dried to form a photosensitive coating that does not become tacky in humid atmosphere.

In addition to the foregoing examples other combinations and procedures embodying the invention will be apparent to those skilled in the art.

I claim:

1. A photosensitive film sensitive to ultraviolet and shorter wave lengths consisting of a solid solution in polyvinylpyrrolidone of triamino-triphenylacetonitrile having at least one hydrogen atom on an amino group.

2. A film photosensitive only to ultraviolet and shorter wave lengths, consisting of a solid solution in polyvinylpyrrolidone of a colorless dye cyanide having the general formula

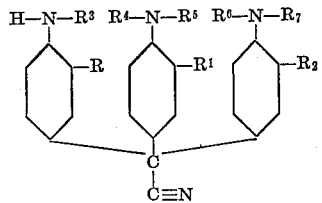

wherein R, $R^1$ and $R^2$ are each selected from the group consisting of a hydrogen atom and a methyl group, and $R^3$, $R^4$, $R^5$, $R^6$ and $R^7$ are each selected from the group consisting of a hydrogen atom and an alkyl group.

3. The photosensitive film of claim 2 in which said dye cyanide is 4,4',4"-triamino-triphenylacetonitrile.

4. The photosensitive film of claim 2 in which said dye cyanide is 4,4',4"-triamino-3-methyl-triphenylacetonitrile.

5. The photosensitive film of claim 2 in which said dye cyanide is 4,4',4" - triamino - 3,3',3"-trimethyl-triphenylacetonitrile.

6. The photosensitive film of claim 2 in which said dye cyanide is 4,4',4"-tris-methylamino-triphenylacetonitrile.

7. The photosensitive film of claim 2 in which said dye cyanide is 4,4',4" - tris - ethylamino-3,3',3"-trimethyl-triphenylacetonitrile.

8. A product of manufacture comprising a base sheet coated with a film photosensitive only to ultraviolet and shorter wave lengths, said film consisting of a solid solution in polyvinylpyrrolidone of a colorless dye cyanide having the general formula

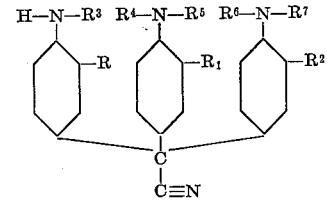

wherein R, $R^1$ and $R^2$ are each selected from the group consisting of a hydrogen atom and a methyl group, and $R^3$, $R^4$, $R^5$, $R^6$ and $R^7$ are each selected from the group consisting of a hydrogen atom and an alkyl group.

9. The product of claim 8 in which said dye cyanide is 4,4',4"-triamino-triphenylacetonitrile.

10. The product of claim 8 in which said dye cyanide is 4,4',4"-triamino-3-methyl-triphenylacetonitrile.

11. The product of claim 8 in which said dye cyanide is 4,4',4" - triamino - 3,3',3"-trimethyl-triphenylacetonitrile.

12. The product of claim 8 in which said dye cyanide is 4,4',4"-tris-methylamino-triphenylacetonitrile.

13. The product of claim 8 in which said dye cyanide is 4,4',4"-tris-ethylamino-3,3',3"-trimethyl-triphenylacetonitrile.

14. A photochemical process comprising exposing to ultraviolet light to produce a colored compound, a photosensitive film consisting of a solid solution in polyvinylpyrrolidone of a colorless dye cyanide having the general formula

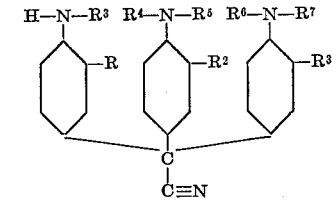

wherein R, $R^1$ and $R^2$ are each selected from the group consisting of a hydrogen atom and a methyl group, and $R^3$, $R^4$, $R^5$, $R^6$ and $R^7$ are each selected from the group consisting of a hydrogen atom and an alkyl group.

References Cited by the Examiner

UNITED STATES PATENTS

| | | | |
|---|---|---|---|
| 2,855,303 | 10/1958 | Chalkley | 96—90 |
| 3,016,308 | 1/1962 | Macauley | 117—36.7 |
| 3,079,258 | 2/1963 | Agruss | 96—90 |
| 3,122,438 | 2/1964 | Chalkley | 96—90 |

FOREIGN PATENTS

| | | |
|---|---|---|
| 757,136 | 9/1956 | Great Britain. |
| 837,000 | 6/1960 | Great Britain. |

OTHER REFERENCES

Bellin et al.: Photoreduction of Eosin in the Bound State, J. Am. Chem. Soc. 79, 2461–4, May 20, 1957, QD 1 A5.

J. TRAVIS BROWN, *Primary Examiner.*

N. G. TORCHIN, *Examiner.*

A. LIBERMAN, D. PRICE, C. E. DAVIS,
*Assistant Exaaminers.*